(No Model.)
O. A. WILLYARD.
HARNESS.
No. 475,912. Patented May 31, 1892.
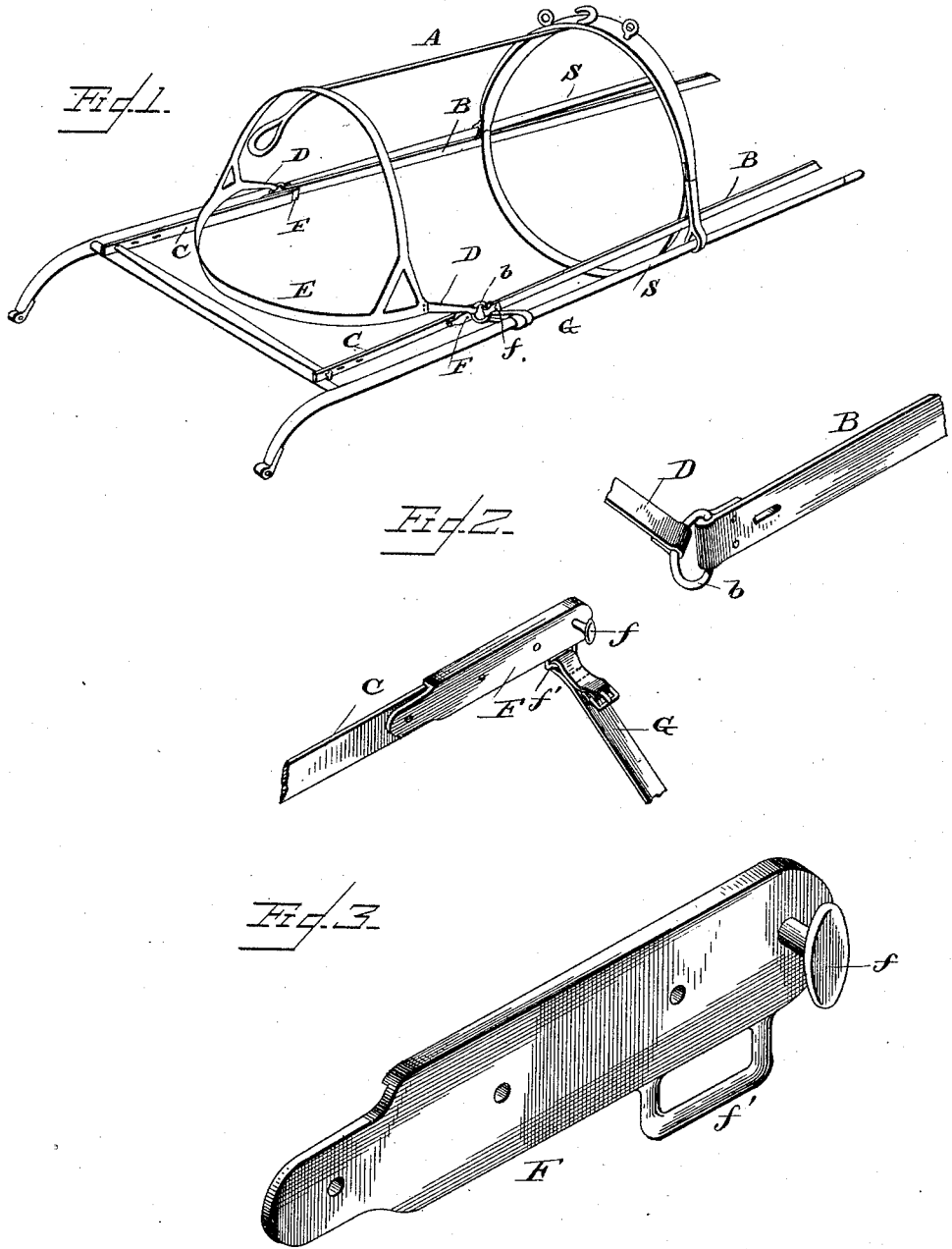
Witnesses
John Dnirie
[signature]
Inventor
Oscar A. Willyard,
By his Attorney
J. R. Littell

UNITED STATES PATENT OFFICE.

OSCAR A. WILLYARD, OF HAMILTON, MICHIGAN.

HARNESS.

SPECIFICATION forming part of Letters Patent No. 475,912, dated May 31, 1892.

Application filed August 1, 1891. Serial No. 401,392. (No model.)

*To all whom it may concern:*

Be it known that I, OSCAR A. WILLYARD, a citizen of the United States, residing at Hamilton, in the county of Allegan and State of Michigan, have invented certain new and useful Improvements in Harness; and I do hereby declare that the following is a full, clear, and exact description of the invention, which will enable others skilled in the art to which it appertains to make and use the same.

This invention relates to that class of harness known as "single" harness, and has special relation to the tugs and holdback comprised therein.

The object of the invention is to provide a separable holdback and separable traces and connecting means whereby but a single operation is necessary in attaching the harness to a vehicle.

A further object of the invention is to provide harness of the character described which will possess advantages in point of inexpensiveness, durability, ease of attachment, and general efficiency.

In the drawings, in which like letters of reference denote corresponding parts, Figure 1 is a perspective view illustrating the application of my invention. Fig. 2 is a detail perspective view of the holdback and adjacent portions of the traces detached. Fig. 3 is a similar view of one of the connecting-plates.

Referring to the drawings, A designates a single harness, which may be in the main of any well-known or preferred pattern. Each trace is divided into two sections, a forward section B B and a rear section C C. The forward ends of the sections B are attached in the usual manner, and the rear ends of said sections are provided each with a ring *b b*. Attached to the latter are the holdback-straps D D, the rear portions of said straps being connected with the breeching E. The rear ends of the sections C of the traces are connected with the whiffletree, as usual, and are adapted to remain upon the vehicle unless it is desired to use the harness in connection with another vehicle. To the forward ends of the sections C are riveted or otherwise secured plates F F, constructed of any suitable metal. These plates F are each provided upon their outer faces near the forward ends with a clip *f f*, disposed at right angles to said plates. Clips *f' f'* are also provided at the under side of said plates near their forward ends. The purpose of such construction will hereinafter appear.

G G designate two straps, which are secured around the thills S, preferably after the manner of attaching the ordinary holdback-straps thereto, and are also buckled to the clips *f'*. The sections B of the traces are adapted to be attached to the clips *f*, and when in such secured position the straps G form practically a continuation of the straps D.

The operation and advantages of my invention will be readily understood by those skilled in the art to which it appertains. The sections C of the traces and also the straps G are always left attached to the vehicle, except in cases where it is desired to transfer the harness for use upon another vehicle. In this condition the traces are connected to the whiffletree, and the straps G are attached to the thills after the manner of the ordinary holdback-straps. In hitching up the only step necessary is to connect the sections B of the traces with the clips *f* upon the plate F, and by this single attachment both the traces and holdback are properly connected with the vehicle. By the construction set forth the necessity of attaching the tugs to the whiffletree and the holdback to the thills at every operation of hitching up is therefore entirely obviated.

Having thus described my invention, I claim as my invention—

1. As an improvement in harness, the combination, with the traces, each formed in two sections, a forward and rear section, respectively, of plates permanently secured to the forward end of the rear sections and connected with the thills by auxiliary holdback-straps and carrying a stud or button, and rings carried by the rear ends of the forward sections and connected to the breeching by main holdback-straps, said rings being adapted to be detachably connected to the plates, substantially as and for the purpose set forth.

2. As an improvement in harness, the combination, with the two-part traces, each comprising a forward section and a rear section provided at its forward end with a plate, said plate being provided with a clip $f$, to which the forward section is adapted to be attached, and with a clip $f'$, of the two-part holdback-straps, comprising the straps proper carrying the breeching and having their forward ends connected with the rear ends of said forward sections of the traces, and the auxiliary straps attached to the clips $f'$ and adapted to connect the rear sections of the traces with the thills, substantially as and for the purpose set forth.

In testimony whereof I affix my signature in presence of two witnesses.

OSCAR A. WILLYARD.

Witnesses:
A. C. ESTABROOK,
L. BAILEY.